June 14, 1955 — U. RANZI — 2,710,680

CENTRIFUGAL POWDER COUPLING

Original Filed Jan. 17, 1947 — 3 Sheets-Sheet 1

INVENTOR.
UBALDO RANZI,
BY
ATTORNEYS.

June 14, 1955  U. RANZI  2,710,680
CENTRIFUGAL POWDER COUPLING
Original Filed Jan. 17, 1947  3 Sheets-Sheet 2
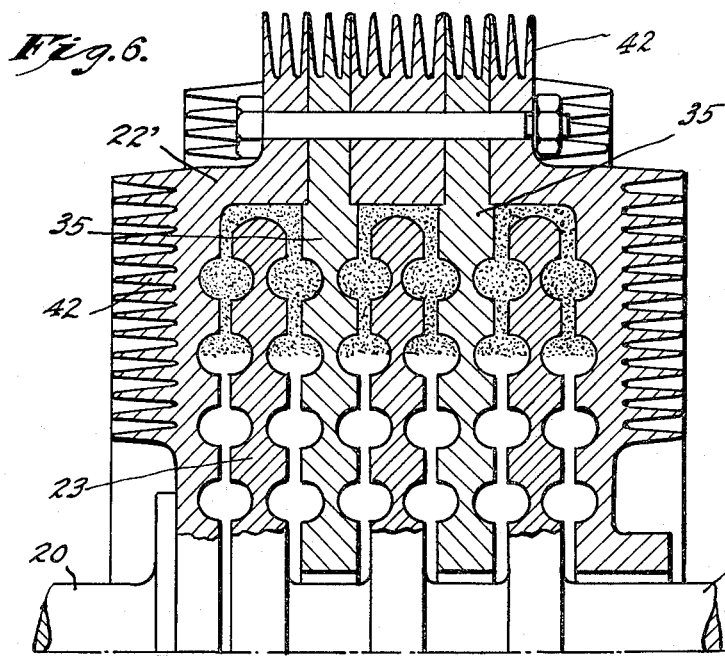
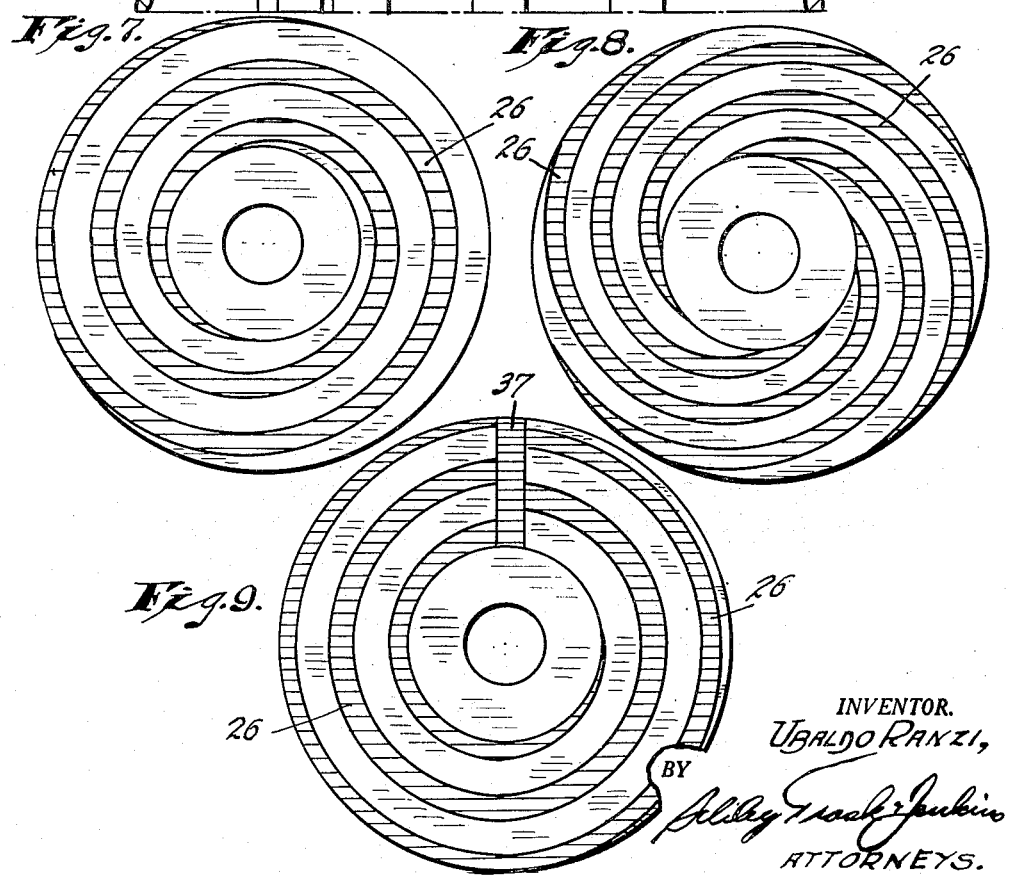
INVENTOR.
UBALDO RANZI,
BY
ATTORNEYS.

June 14, 1955 U. RANZI 2,710,680
CENTRIFUGAL POWDER COUPLING
Original Filed Jan. 17, 1947 3 Sheets-Sheet 3
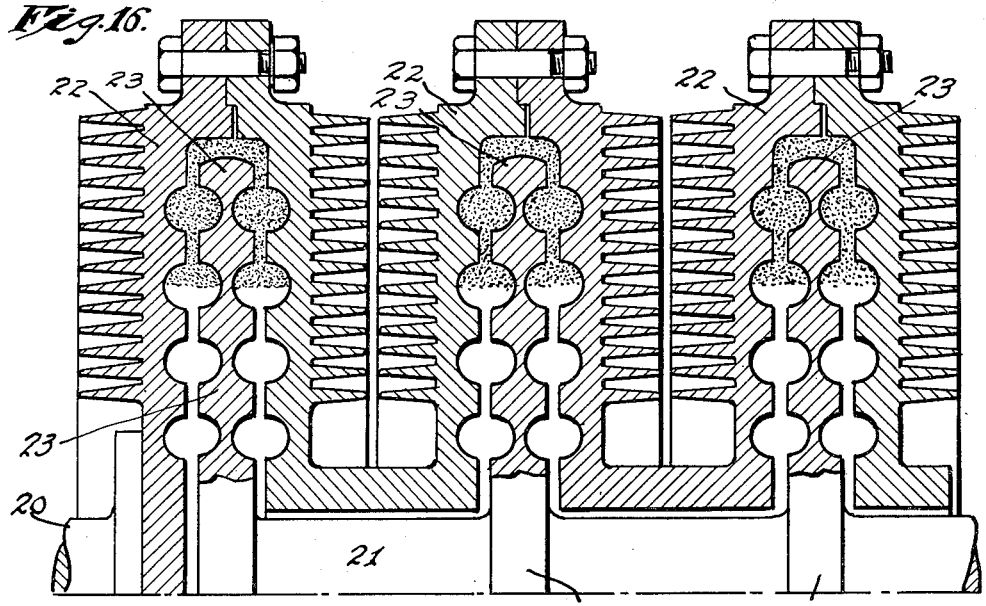
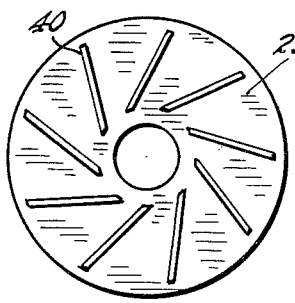
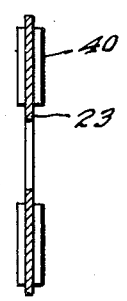
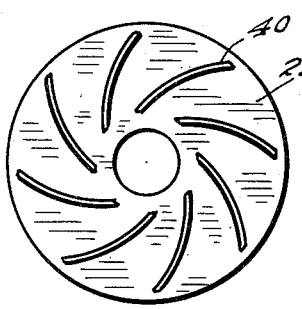
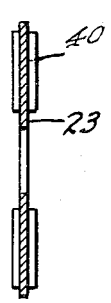
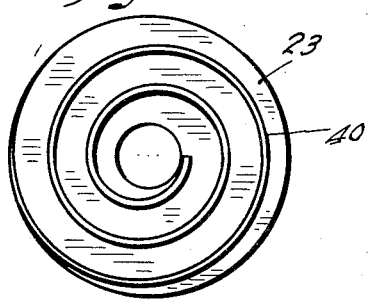
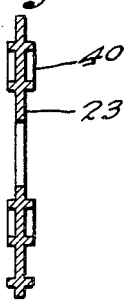
INVENTOR.
UBALDO RANZI,
BY
ATTORNEYS.

United States Patent Office 2,710,680
Patented June 14, 1955

2,710,680

CENTRIFUGAL POWDER COUPLING

Ubaldo Ranzi, Legnano, Italy

Original application January 17, 1947, Serial No. 722,497. Divided and this application December 9, 1948, Serial No. 64,403. In Italy October 9, 1943

Section 1, Public Law 690, August 8, 1946
Patent expires October 9, 1963

6 Claims. (Cl. 192—58)

This application is a divisional application from application No. 722,497, filed January 17, 1947.

The present invention relates to a centrifugal powder coupling in which the coupling between the driving and driven elements is effected through the medium of a particled solid material such as graphite, talc, or the like. Commonly, one of the elements of such a coupling, in most instances the driving element, is in the form of a rotatable hollow casing and the other element is in the form of a disk-like rotor supported within the casing and rotatable relatively thereto. The rotor or disk is spaced from the inner surfaces of the casing to provide spaces for the reception of the particled material, which will hereinafter be referred to as the powder.

In the operation of such a coupling, the powder becomes distributed circumferentially and pressure builds up within it as the result of centrifugal force, and the pressure of the powder against the surfaces of the driving and driven elements creates friction enabling the coupling to transmit a torque. Increasing the speed of rotation increases the centrifugal force acting on the powder and the pressure which the powder exerts on the coupling-elements, thus increasing friction and the torque which the coupling transmits.

An improved coupling according to this invention is characterized by the fact that opposed radially extending surfaces of the driving and driven elements are provided with ribs or grooves which are oblique to the radial direction, preferably being in the form of spirals, with the inclination or pitch of the ribs or grooves such as to urge the powder outwardly when the coupling transmits torque in the normal driving direction. Such outward urging of the powder augments the effect of centrifugal force in building up pressure and hence increases the torque which the coupling transmits in the driving direction. Upon reversal of the direction of torque-transmission, the reaction of the inclined ribs or grooves on the powder opposes the effect of centrifugal force and thus reduces the torque transmitted. Because of this action, the coupling possesses unidirectional or free wheeling characteristics.

In the accompanying drawings, which illustrate the invention:

Fig. 6 is a view similar to Fig. 1 illustrating a modified type of coupling;

Figure 1:
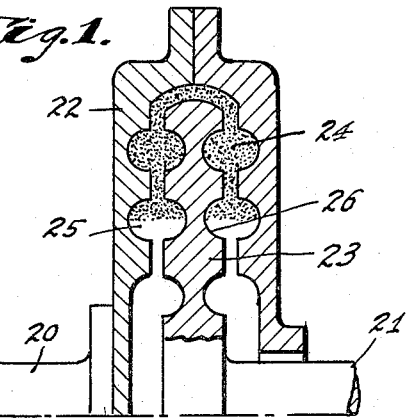
Fig. 1 is a fragmental axial section through a simple form of coupling illustrating a position occupied by the powder when the coupling is in operation.
Figure 2:
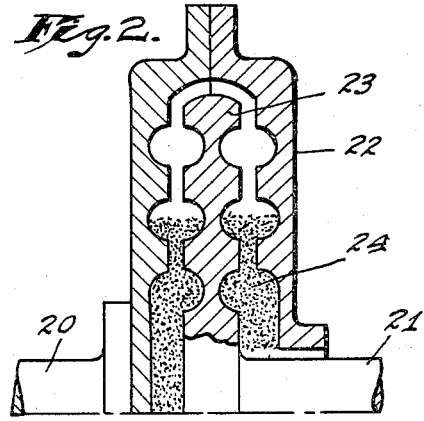
Fig. 2 is a view similar to Fig. 1 showing the position of the powder when the coupling is at rest.

Figs. 7, 8, and 9 are elevational views of the powder-engaging surfaces of coupling elements illustrating different forms which may be taken by powder-engaging grooves;

Figs. 10, 12, and 14 are elevational views of coupling-disks illustrating various forms of powder-engaging ribs;

Figs. 11, 13, and 15 are axial sections through the disks shown respectively in Figs. 10, 12, and 14;

Fig. 16 is an axial section similar to Figs. 1, 2, and 6 illustrating still another modification.

The construction shown in Fig. 1 comprises a driving shaft 20 and a driven shaft 21 in at least approximate alignment with each other. Rigidly mounted on the driving shaft 20 is a hollow casing 22 which loosely receives a disk-like rotor 23 secured to the shaft 21, such shaft extending through an axial opening in the casing 22. A supply of powder 24 partially fills the space between the casing 22 and disk 23. When the coupling is in operation, the powder distributes itself circumferentially and occupies the position illustrated in Fig. 1; while when the coupling is out of operation, the powder drops downwardly or into a position such as is indicated in Fig. 2.

Figure 3:
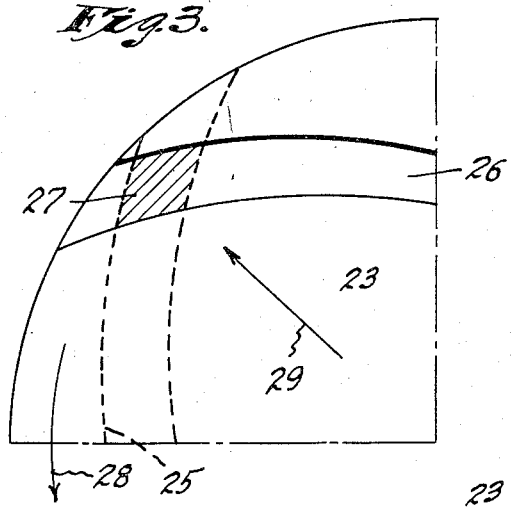
Figs. 3 and 4 are fragmental diagrammatic views illustrating the action of the spiral ribs or grooves on the powder during torque-transmission in opposite directions.

Opposed, radially extending surfaces of the casing 22 and disk 23 are provided with spiral or spirally inclined powder-engaging elements shown in Figs. 1 to 5 as grooves, the grooves in the casing or driving element being designated by the reference numeral 25 and those in the driven element by the reference numeral 26. To understand the action of the coupling, reference may be had to Figs. 3 and 4 in which the shaded area 27 represents a portion of the powder 24 lying within the sides of intersecting grooves 25 and 26. In Fig. 3 it is assumed that the casing is rotating in the direction indicated by the arrow 28 and is transmitting driving torque to the driven element 23. As will be evident any slippage, or any rotation of the driving element relative to the driven element in the direction of the arrow 28 (Fig. 3), would urge the powder-mass 27 outwardly, as indicated by the arrow 29 in Fig. 3, thus tending to increase the pressure within the powder to increase friction and the torque transmitted. The torque which the coupling transmits in the driving direction depends upon the diameter of the coupling, the number of opposed powder-engaging surfaces, the quantity of the powder, the speed of rotation, the pitch or inclination of the grooves 25 and 26, the distance between the opposed powder-engaging surfaces of the coupling elements, and the coefficient of friction of powder.

Figure 4:
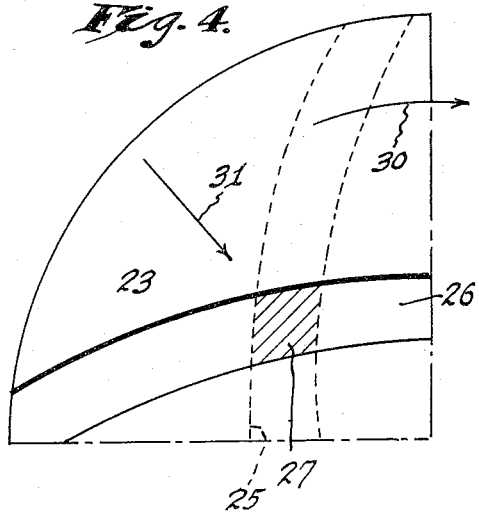
Figure 5:
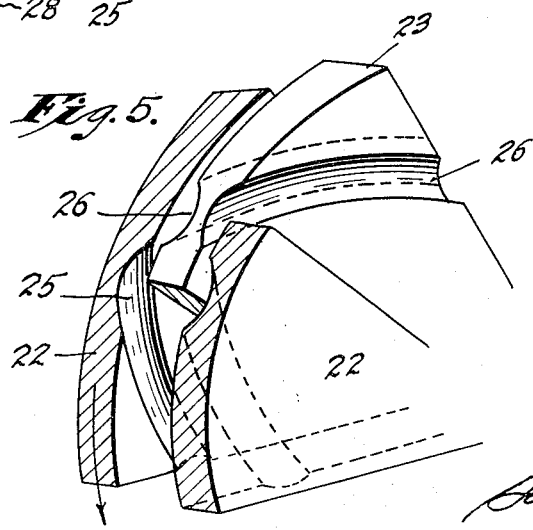
Fig. 5 is a fragmental isometric view, in partial section, of the coupling shown in Figs. 1 and 2.

Should any tendency to overrun develop, the driving element would tend to rotate relatively to the driven element in the direction indicated by the arrow 30 in Fig. 4, thus urging the powder mass 27 inwardly as indicated by the arrow 31. Such inward movement of the powder, by opposing centrifugal force, will greatly decrease the torque which the coupling can transmit, since friction between the powder and coupling elements will be reduced, the powder will be moved toward the axis to reduce the lever arm of such friction as does exist, and the powder ring will be continually disintegrating owing to the relative movement of the spiral grooves.

In Fig. 6, I have illustrated a coupling possessing augmented torque-transmitting characteristics by virtue of a multiplication of the number of opposed powder-engaging surfaces on the coupling elements. As shown, the casing 22' is provided with axially spaced diaphragms 35 which divide the interior of the casing axially into a plurality of chambers each of which contains a disk 23 secured to the shaft 21. As shown, there are two of the diaphragms 35 and three of the disks 23, and the coupling would therefore possess substantially three times the torque-transmitting capacity of a coupling otherwise similar but embodying only a single disk 23.

In Figs. 7, 8, and 9, I have shown three different forms which the grooves 25 and 26 may assume. In Fig. 7, I have shown a single spiral groove 26 which has a relatively slight spiral inclination and possesses approximately two complete turns between its inner and outer ends. In Fig. 8, there are four of the grooves 26 arranged at equal angular intervals, with each groove being of considerably steeper pitch than the groove of Fig. 7 and possessing only about one-half turn between its inner and outer ends. In Fig. 9, the spirally extending grooves are interrupted by a radial groove 37, which makes it possible to reduce the pitch of the grooves without reducing their width. In general, relatively steeply pitched grooves, such as those of Fig. 8, are desirable for coupling having low peripheral speeds or where it is desired that the torque transmitted increase rapidly with increasing speed, while grooves of relatively small pitch, such as those of Figs. 7 and 9, are suitable for use where it is desired that the torque increase slowly with increasing rotation of speeds. Generally, overrunning is favored by reducing the pitch of the grooves.

Instead of employing grooves as powder-engaging elements in the opposed faces of the driving and driven parts, I may employ ribs. Thus, in Figs. 10 to 15 I have shown the disk 23 as provided with annular series of ribs 40 of different shapes. In Figs. 10 and 11, the ribs are straight, but are disposed on the face of the disk 23 obliquely to the radial direction. In Figs. 12 and 13 I have shown an annular series of ribs with each rib having the form of a portion of a spiral. In Figs. 14 and 15 the disk is provided on each of its faces with a single rib 40 of relatively small pitch. The ribs of Figs. 10 to 15 operate in substantially the same fashion as do the grooves of Figs. 7 to 9, and the same considerations will determine their number and form.

In Fig. 16 I have shown a coupling comprising three separate casings 22 rigidly interconnected but axially spaced apart, each casing receiving a rotor or disk 23 secured to the shaft 21. When slippage occurs in any of my couplings—that is, when there is relative rotation between the driving and driven elements—heat is generated by the friction between the powder and the surfaces of the coupling elements it engages. The construction shown in Fig. 16 is especially desirable when the coupling is subject to slippage over long periods of time, as the separation of the casings 22 provides for an improved dissipation of the heat generated by friction. Further to improve heat dissipation and reduce internal temperatures, the couplings of Figs. 6 and 16 are shown as provided with heat-radiating ribs or fins 42.

In most couplings, suitable bearings, which may be either plain or anti-friction bearings, although not shown, will be provided between the shafts 20 and 21 or the elements respectively carried thereby to maintain the coupling elements in alignment. In the absence of such bearings, and with appropriate clearances provided, as around the shaft 21 and between the disk 23 and the inner walls of the casing, the axes of the driving and driven elements may be displaced from a condition of alignment within certain limits, thus permitting the coupling to possess the attributes of a universal joint without affecting its torque-transmitting characteristics.

When a coupling in accordance with my invention is first placed in operation the powder distributes itself circumferentially and, as the rotational speed of the powder and the driving element increases, pressure in the powder, friction between the powder and coupling elements, and the torque applied to the driven element likewise increase. When the torque applied to the driven element reaches or exceeds that opposing its rotation, the driven element begins to rotate at a progressively increasing speed. The coupling thus provides for a gradual and progressive application of the driving power to the driven element. For any given speed, the coupling will be capable of transmitting a definite maximum torque without slippage; and if that torque should be exceeded, the coupling can slip and prevent overload on the power-source. The spirally inclined powder-engaging elements increase the torque-transmitting capabilities of the coupling and also impart to it unidirectional characteristics permitting free wheeling or overrunning, all as above set forth.

Having now particularly described and ascertained the nature of my said invention and in what manner the same is to be performed, I declare that what I claim is:

1. A centrifugal powder coupling for connecting two rotating shafts, comprising a casing connected with one of said shafts, a disc mounted loosely rotatable within said casing and connected to the other of said shafts, particled solid material contained in said casing, said casing and disc having opposed faces provided with elements engageable with said particled material and inclined to the radial direction, the inclination of the material-engaging elements on the disc being opposite to that of the elements on the casing.

2. A coupling as set forth in claim 1 with the addition that said material-engaging elements are of spiral form.

3. The invention set forth in claim 2 with the addition that at least one of the opposed surfaces of said disc and casing is provided with a generally radial material-engaging element intersecting said elements of spiral form.

4. A coupling as set forth in claim 1 with the addition that each of the opposed surfaces of the casing and disc has a central portion free from radially inclined material-engaging elements and defining a central recess capable of receiving the particled material when the relative rotation of the disc and casing is in such a direction that the radially inclined elements urge such material radially inward.

5. A coupling as set forth in claim 1 with the addition that said casing is provided interiorly with a diaphragm dividing it into two disc-receiving compartments, the disc-bearing shaft having a disc in each of such compartments.

6. A centrifugal powder coupling for connecting two rotating shafts, comprising a rotatable casing element having a central recess, a disc element disposed in said recess and rotatable relative to said casing, and a supply of particled solid material within said recess, said recess and disc having opposed, radially extending faces at least one of which is provided with one or more surfaces engaging the particled material to urge it radially when torque is transmitted between the particled material and the coupling-element having said surfaces, said faces including, on opposite sides of any diameter of the coupling element having them, portions which are similarly inclined with respect to the radial direction.

References Cited in the file of this patent

UNITED STATES PATENTS

| | | |
|---|---|---|
| 1,848,616 | Fottinger | Mar. 8, 1932 |
| 1,887,610 | Widegren et al. | Nov. 15, 1932 |
| 1,927,616 | Rudquist | Sept. 19, 1933 |
| 2,079,724 | Van Ranst | May 11, 1937 |

FOREIGN PATENTS

| | | |
|---|---|---|
| 46,612 | Denmark | Dec. 12, 1932 |
| 380,346 | Great Britain | 1932 |
| 463,689 | Belgium | Apr. 1946 |
| 528,502 | France | Nov. 14, 1921 |
| 920,562 | France | Apr. 11, 1947 |